(No Model.) 2 Sheets—Sheet 1.

C. T. BROWN.
BALL BEARING FOR BICYCLES.

No. 569,005. Patented Oct. 6, 1896.

Witnesses:
R. J. Jacker,
J. H. Harrison.

Inventor:
Charles T. Brown,
By Brown & Brown, Att'ys.

(No Model.) 2 Sheets—Sheet 2.

C. T. BROWN.
BALL BEARING FOR BICYCLES.

No. 569,005. Patented Oct. 6, 1896.

Witnesses:
W. J. Jacker
John H. Harrison

Inventor:
Charles T. Brown;
By Brown & Brown,
Attys

UNITED STATES PATENT OFFICE.

CHARLES T. BROWN, OF CHICAGO, ILLINOIS, ASSIGNOR OF ONE-HALF TO FLORA L. BROWN, OF SAME PLACE.

BALL-BEARING FOR BICYCLES.

SPECIFICATION forming part of Letters Patent No. 569,005, dated October 6, 1896.

Application filed June 8, 1896. Serial No. 594,683. (No model.)

*To all whom it may concern:*

Be it known that I, CHARLES T. BROWN, a resident of Chicago, in the county of Cook and State of Illinois, have invented certain new and useful Improvements in Ball-Bearings for Bicycles and other Vehicles, of which the following is a specification.

This invention relates to bearings for bicycles and other vehicles in which balls are adjustably interposed between the axle and the hub of a wheel, such axle being non-rotatable and such hub being rotatable, and also to bearings for the crank-shaft of a bicycle wherein the crank-shaft or axle revolves in a non-rotatable hanger, with balls adjustably interposed between the crank-shaft and the hanger; and the object of my invention is to obtain a bearing of the character described wherein the points of contact of the rotating hub (or the non-rotating hanger) at both ends of the hub or hanger will be in vertical planes midway between the planes in which the points of contact of the balls with the axle or shaft are respectively located, and wherein the adjustment of all the contact-points is obtained by the adjustment of a single point or element of the bearing.

A further object of my invention is to obtain a ball-bearing which shall be simple in construction, not liable to get out of repair, and which can be easily taken apart, cleaned, put together, and adjusted by a person not particularly skilled in mechanics.

Figure 1:
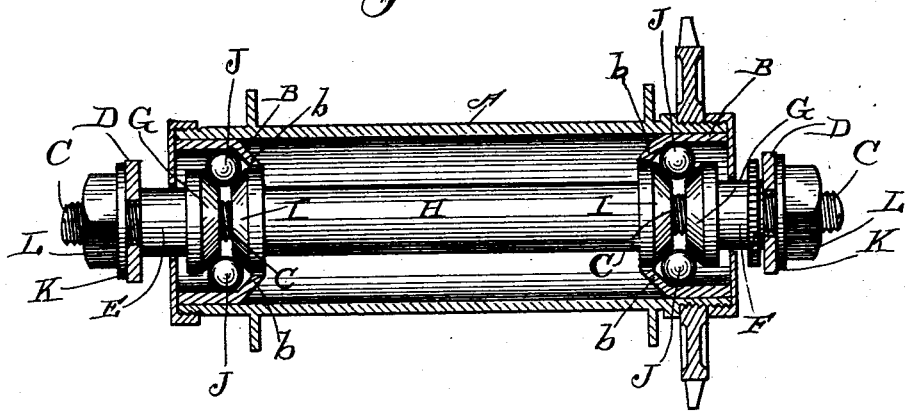
Figure 2:
Figure 3:
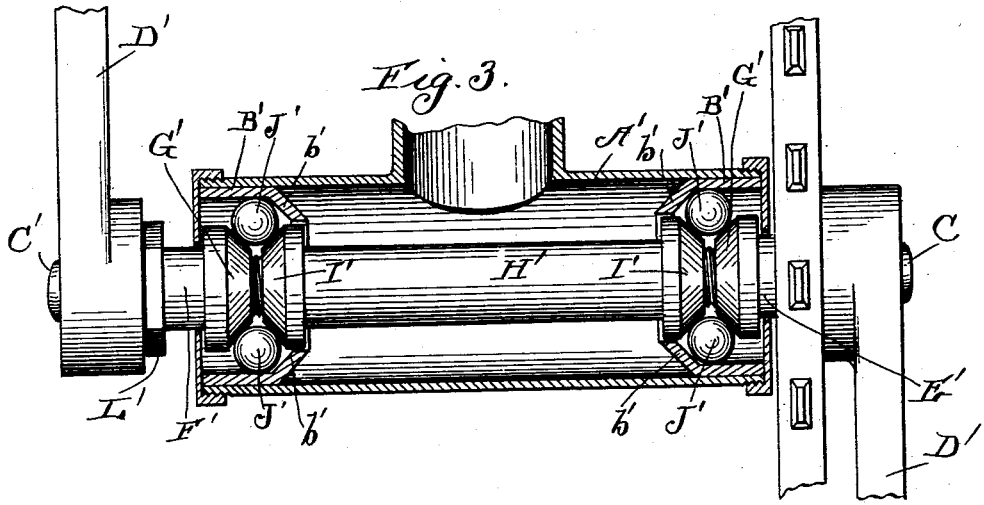
Figure 4:
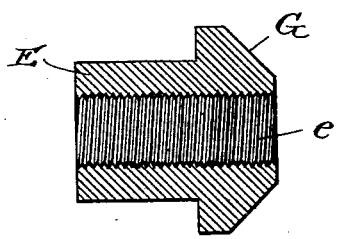
Figure 5:
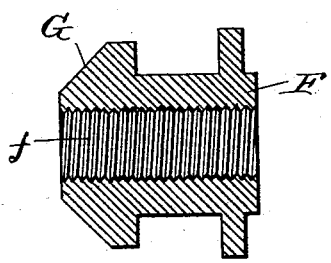
Figure 6:
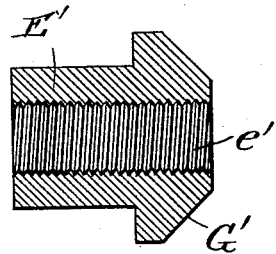
Figure 7:
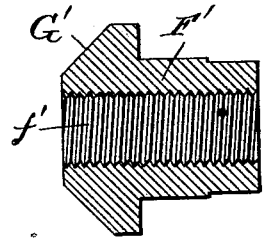

In the drawings accompanying and forming a part of this specification, Figure 1 is a central longitudinal sectional view of a ball-bearing hub embodying my invention; Fig. 2, a central longitudinal sectional view of a spool having cones at the ends thereof, which is an element entering into ball-bearings embodying the invention; and Fig. 3 is a central longitudinal sectional view of a crank-shaft and hanger. Figs. 4 and 5, respectively, are vertical sectional views of cones on the axle of a hub-bearing; and Figs. 6 and 7 vertical sectional views of cones on the crank-shaft of a crank-shaft and hanger embodying the invention.

A reference-letter applied to indicate a given part is used to designate such part throughout the several figures of the drawings wherever the same appears.

A is the barrel or casing of a rotatable hub.

B B are cups firmly secured in barrel A, and $b$ $b$ are internal annular flanges in such cups.

C is a non-rotatable axle extending through barrel A.

D D are the arms of a bicycle-fork.

E is a cone which may be rigidly secured on axle C, and F is a cone similar to cone E, but adjustably secured on axle C by means of screw-threads $f'$ engaging corresponding threads on axle C.

Sleeve E may be adjustably secured on axle C, as by threads $e$ engaging corresponding threads on such axle, but not necessarily so, and I prefer to secure it rigidly thereon.

G G are cone-faces on cones E F, respectively, with which the balls J J, hereinafter described, come in contact.

H is a spool having cone-faces I I at the ends thereof. Spool H fits loosely on axle C, so that when the bearing is being adjusted the spool and axle may move longitudinally relatively to each other.

J J are balls interposed between the axle C and barrel A, such balls having contact with cone-faces G I and the internal face of the cylindrical walls of cups B B in barrel A.

The axle C being non-rotatable and the only tendency of spool H to rotate being that, if any, which is imparted to it by balls J J in contact with cone-faces I I, I do not deem it necessary to provide any means to prevent such rotation, although it is to be understood that the spool H is not designed to rotate on axle C in the operation of the bearing.

K K are washers on axle C.

L L are nuts holding arms D D in close contact with the ends of cones E F, respectively.

To adjust the ball-bearing just described, and illustrated in Fig. 1, it is simply necessary, after having placed barrel A, with cups B B therein, in proper relative position to axle C and with balls J J interposed between the several cones and the cups, to move cone F longitudinally on axle C (by turning it thereon) until the several cone-faces G I and the internal face of the cylindrical walls of cups B B are in contact, or nearly so, with the balls J J. At such time the internal flanges b b of cups B B are near to contact with the balls J J to receive any end thrust from barrel A and transmit the same, through such balls J J, to the axle C. That is, assuming the cone F is turned on the axle until the balls J J, adjacent thereto, are in contact with face G of such cone F, cone-face I on the end of spool H, which is adjacent to cone F, and the inner cylindrical wall of cup B. Cone F cannot then be made to approach any nearer to the sleeve H. Hence further turning of the cone F on axle C will draw such axle through spool H until cone E on the axle is brought so near to the cone-face on the end of spool H, adjacent thereto, that the balls J J thereover are in contact with cone E, cone-face I on spool H, adjacent thereto, and the inner cylindrical wall of the cup B. At such time, if the contact of the several balls with the several surfaces adjacent thereto, as described, is not too close, the bearing is in adjustment. If such balls are in too close contact with the several surfaces adjacent thereto, a slight backward turn of the cone F will put the bearing into adjustment.

In adjusting the bearing, as above stated, the spool H is moved on the axle C and an even adjustment of the several contact-points is simultaneously obtained by merely turning cone F on axle C.

In the crank-shaft and hanger embodying my invention, which is illustrated in Fig. 3, A' is the non-rotatable crank-shaft hanger or casing of a bicycle. B' B' are cups therein having internal flanges b' b'. C' is a rotatable crank-shaft, and D' D' the pedals on such crank-shaft. E' is a cone, which is, preferably, rigidly secured on crank-shaft C', but which may be adjustably secured thereon, as by threads e' e' engaging with corresponding threads on the crank-shaft, and F' is a similar cone adjustably secured thereon by internal screw-threads f' f' engaging with corresponding threads on such crank-shaft C'. G' G' are cone-faces on cones E' F', respectively. H' is a spool mounted on crank-shaft C', so that such crank-shaft and spool may move or be moved longitudinally to each other. I' I' are the cone-faces on spool H'. J' J' are balls interposed between the cone-faces G' I' and the cylindrical walls of cups B' B', respectively.

The adjustment of the hanger and crank-shaft embodying my invention is substantially the same as the adjustment of the hub and axle embodying it; that is, the cone F' is turned on the crank-shaft C' and so moved longitudinally thereon until balls J' J' are in contact or near to contact with cone-faces G' I' and the inner faces of the cylindrical walls of cups B' B'. Cone F' is held in adjustment by jam-nut L'.

In a ball-bearing constructed as herein described and illustrated but one adjustable part (cone E or cone E') is required, and the load is fairly and evenly carried by the balls of the bearing, so that there is no twisting or grinding motion thereto, and, too, the bearing can be as readily taken apart as an ordinary ball-bearing.

I am aware that ball-bearings have heretofore been used in bicycles, consisting of an axle, cones on the axles, one or both of the cones adjustable, a barrel, cups in the barrel, such cups having internal annular flanges, and balls interposed between the cones and the cups, all substantially as hereinbefore described, but without the spool H and cones I I. In such previous constructions the balls contact with the cones, with the inner surface of the cylindrical walls of the cups, and with the internal annular flange, while in the bearing embodying my invention the balls J J contact with cone-surfaces G and I and with the inner surface of the cylindrical walls of the cups and are near to contact (but not in contact) with the internal annular flange of the cups. I am also aware that oppositely-inclined cones have been placed at both ends of a hub or casing, so that the balls interposed between such cones and the cylindrical wall surrounding them shall be in contact therewith; but in all such constructions at least one cone at each end of the hub or casing must be adjustable, while in the apparatus embodying my invention only one cone at one end of the hub or casing need be adjustable, as described.

I claim—

1. A ball-bearing comprising a shaft, cones thereon each having a track, one cone being adjustable, a casing, cups having internally-extending annular flanges, balls interposed between the cones and cups, a spool longitudinally movable on the shaft between the cones thereon, said spool being provided on its ends with tracks for the balls, and such tracks corresponding with the tracks on the cones.

2. A ball-bearing comprising a shaft, cones thereon, each having a track, one cone being adjustable, a casing having tracks therein, balls interposed between the tracks on the cones and the tracks in said casing, a spool longitudinally movable on the shaft between the cones thereon, said spool being provided on its ends with tracks for the balls, such casing, cones and balls being constructed to cooperate and transmit end thrust through the balls between the cylinder and cones.

3. In a ball-bearing, two sets of balls, and three bearing-surfaces for every ball of both sets, the inner bearing of both sets being connected and movable endwise on the shaft, whereby pressure upon one set of balls is transferred to the other, substantially as shown.

4. In a ball-bearing two sets of balls, combined with an endwise-movable spool or sleeve placed on the shaft and having a cone-bearing upon each end, substantially as described.

5. In a ball-bearing the shaft, a stationary cone-bearing upon one end of the shaft, and an adjustable one upon the other, and stationary cups which form the outer bearings for the balls, combined with an endwise-movable spool or sleeve placed on the shaft and having a cone-bearing upon each end, whereby all of the bearings can be adjusted by the adjustable cone from one end, substantially as set forth.

CHARLES T. BROWN.

In presence of—
FLORA L. BROWN,
JOHN H. McELROY.